UNITED STATES PATENT OFFICE.

ISAIAH JENNINGS, OF NEW YORK, N. Y.

LAMP.

Specification of Letters Patent No. 31, dated September 22, 1836.

*To all whom it may concern:*

Be it known that I, ISAIAH JENNINGS, of the city of New York, in the State of New York, have invented a new and useful improvement in the production of fire and light by a combination of liquids and the application of the same in common lamps either with or without a wick; and I do hereby declare that the following is a full and exact description thereof.

The liquids that I usually employ are, alcohol and spirits of turpentine which two liquids I combine together in such a way that the alcohol will be saturated with the spirits of turpentine so as to carbonate the same and cause it to burn with brilliancy. The quantity of turpentine that will combine with the alcohol will depend upon the strength of the latter fluid, which to afford a clear white light should be such as will enable it to form a combination containing not less than one-sixth part of turpentine, but if it will combine so that turpentine will form one-fifth, it is to be preferred. Although I generally use spirits of turpentine, I have essayed other essential oils and analogous compounds, which I have found to answer the same purpose more or less perfectly, but I have preferred spirits of turpentine on account of the economy with which it can be used. When the strength of the alcohol is known, the exact quantity that will combine may be at once added, but it may be put in, in excess agitated and the uncombined portion allowed to separate, and the liquid decanted.

I am aware that I am not the discoverer of the simple fact that the addition of spirits of turpentine or other essential oils to alcohol will cause it to burn with increased brilliancy, but I claim to be the discoverer of the applicability of this combined material and of others possessing analogous properties as a substitute for oil in common lamps, and the first who has applied the same, having been enabled so to do by my experiments upon the proper combining proportions according to the strength of the alcohol, and it is for this discovery and application that I solicit Letters Patent.

ISAIAH JENNINGS.

Witnesses:
 SAM STETTINEUS,
 DANIEL H. RAY.